United States Patent
Sanderson

(10) Patent No.: US 9,480,951 B2
(45) Date of Patent: Nov. 1, 2016

(54) MASS TRANSFER DEVICE AND SYSTEM GENERATING VORTICES FOR PARTICLE SUSPENSION, CONCENTRATION, AND TRANSPORT

(71) Applicant: College of William and Mary, Williamsburg, VA (US)

(72) Inventor: S. Laurie Sanderson, Gloucester Point, VA (US)

(73) Assignee: College of William and Mary, Williamsburg, VA (US)

( * ) Notice: Subject to any disclaimer, the term of this patent is extended or adjusted under 35 U.S.C. 154(b) by 0 days.

(21) Appl. No.: 14/619,377

(22) Filed: Feb. 11, 2015

(65) Prior Publication Data

US 2015/0231573 A1    Aug. 20, 2015

Related U.S. Application Data

(60) Provisional application No. 62/041,190, filed on Aug. 25, 2014, provisional application No. 62/001,787, filed on May 22, 2014, provisional application No. 61/939,894, filed on Feb. 14, 2014.

(51) Int. Cl.
    *B01D 63/06*      (2006.01)
    *B01D 69/04*      (2006.01)
    (Continued)

(52) U.S. Cl.
    CPC .............. *B01D 63/06* (2013.01); *B01D 45/04* (2013.01); *B01D 45/16* (2013.01); *B01D 65/08* (2013.01);
    (Continued)

(58) Field of Classification Search
CPC ...... B01D 69/04; B01D 71/06; B01D 61/18; B01D 61/28; B01D 63/06; B01D 2325/028; B01D 2317/02; B01D 45/04; B01D 45/16; B01D 21/003; B01D 21/0012; B01D 21/34; B01D 21/267; B01D 21/2488; B01D 65/08; B01D 29/115; B01D 29/885; B01D 29/902; B01D 29/908; B01D 2321/2016; B01D 2201/287; B04C 3/00; B04C 5/00; B04C 5/02; B04C 5/04; B04C 5/06; B04C 5/08; B04C 5/13; B04C 5/14; B04C 5/24; B04C 2009/004; B01F 2005/0002; B01F 2005/0017; B01F 5/0475; B01F 5/0483; B01F 5/049; B01F 5/06; B01F 5/0661; B01F 5/0665
See application file for complete search history.

(56) References Cited

U.S. PATENT DOCUMENTS 2,998,137 A *    8/1961    Vane ...................... B01D 29/11
                                                                          209/17
4,171,643 A      10/1979    Frick
(Continued)

FOREIGN PATENT DOCUMENTS

WO          01/00307 A2      1/2001
WO      2013/184814 A1    12/2013

OTHER PUBLICATIONS

Monfared et al., "CFD simulation of bafles arrangement for gelatin-water ultrafiltration in rectangular channel", Desalination (2012), vol. 284, pp. 288-296.

*Primary Examiner* — Katherine Zalasky
*Assistant Examiner* — Benjamin Lebron
(74) *Attorney, Agent, or Firm* — Jason P. McDevitt

(57) ABSTRACT

A mass transfer device includes a wall structure having a first surface and a second surface. The wall structure has slots extending there through between the first and second surfaces. Each slot has a width, a length and a height. For purposes of mass transfer applications to include cross-flow fluid filtering, the length is at least approximately 3 times the width for each of the slots, and a width-to-height ratio for each of the slots is less than approximately 5.

14 Claims, 16 Drawing Sheets

(51) Int. Cl.
*B01D 69/02* (2006.01)
*B01D 65/08* (2006.01)
*B01D 45/04* (2006.01)
*B01D 45/16* (2006.01)
*B01D 21/00* (2006.01)
*B01F 5/00* (2006.01)
*B01F 5/06* (2006.01)
*B01F 5/04* (2006.01)

(52) U.S. Cl.
CPC ............... *B01D 69/02* (2013.01); *B01D 69/04* (2013.01); *B01D 21/0003* (2013.01); *B01D 2321/2016* (2013.01); *B01D 2325/021* (2013.01); *B01F 5/0475* (2013.01); *B01F 5/06* (2013.01); *B01F 5/0661* (2013.01); *B01F 2005/0002* (2013.01); *B01F 2005/0017* (2013.01)

(56) References Cited

U.S. PATENT DOCUMENTS

| | | | | |
|---|---|---|---|---|
| 5,500,134 A | * | 3/1996 | Chahine | B01D 29/115 210/315 |
| 5,843,211 A | * | 12/1998 | Bielefeldt | B01D 45/12 55/459.1 |
| 6,986,428 B2 | | 1/2006 | Hester | |
| 7,351,005 B2 | | 4/2008 | Potts | |

* cited by examiner

MASS TRANSFER DEVICE AND SYSTEM GENERATING VORTICES FOR PARTICLE SUSPENSION, CONCENTRATION, AND TRANSPORT

CROSS-REFERENCE TO RELATED APPLICATIONS

The present application claims priority under 35 U.S.C. §119(e) to (i) U.S. Provisional Patent Application No. 62/041,190, filed Aug. 25, 2014, (ii) U.S. Provisional Patent Application No. 62/001,787, filed May 22, 2014, and (iii) U.S. Provisional Patent Application No. 61/939,894, filed Feb. 14, 2014. The disclosures of these applications are incorporated by reference herein.

STATEMENT REGARDING FEDERALLY SPONSORED RESEARCH AND DEVELOPMENT

This invention was made with government support under Grant No. IBN-0131293 awarded by the National Science Foundation. The government has certain rights in the invention.

FIELD OF INVENTION

The field of the invention relates generally to mass transfer involving the suspension, concentration, and transport of mass, and more particularly to filters and filtration that utilize one or more slots in a tube or sheet wall to generate sustained vortices for particle suspension, concentration, and transport.

BACKGROUND OF THE INVENTION

Mass transfer occurs when advection and diffusion cause the net movement of mass from one location to another location. In chemical engineering and a diversity of industries, mass transfer is an energy-intensive process requiring extensive capital investment. Mass transfer processes and/or systems include, for example, filtration processes and filters, inertial microfluidics, liquid/liquid and gas/liquid separation, bioreactors and chemical reactors, static mixing, feed delivery, adsorption by activated carbon beds, and dispensing systems. The high pressures needed to transport mass and the drag opposing that transport result in substantial energy expenditure.

The filtering of particles from a fluid generally involves moving the particle-filled fluid to impact a filter membrane perpendicularly (known as dead-end filtration) or moving the particle-filled fluid tangentially across a filter membrane (known as cross-flow filtration). Over time, the filter membrane clogs with particles for both of these filtering approaches, increasing the transmembrane pressure and the energy required for filtration. Clogging in dead-end filtering occurs as the particle-filled fluid is pushed against the filter membrane and the extracted particles remain on one side thereof. Clogging in cross-flow filtration also occurs via a phenomenon termed "concentration polarization" whereby small particles accumulate in a layer near the filter membrane surface. In either case, the filter membrane must then be backwashed or mechanically cleaned, chemically treated, or replaced. Each of these options can be time-consuming and/or costly.

BRIEF SUMMARY OF THE INVENTION

In accordance with the present invention, a mass transfer device includes a wall structure having a first surface and a second surface. The wall structure has a plurality of slots extending there through between the first surface and the second surface. Each slot has a width, a length and a height. The length of each slot is at least approximately 3 times that of the width of the slot. A width-to-height ratio for each slot is defined. For purposes of mass transfer applications to include cross-flow fluid filtering, the width-to-height ratio for each slot is less than approximately 5.

Herein is described a system and method for mass transfer including a flow of fluid with particles entrained therein, said flow moving in a defined direction; and a wall structure disposed in said flow with a plurality of slots between the inner and outer surface of the wall structure, each of said slots having a width, a length and a height, wherein the length of the slots is at least approximately 3 times greater than the width of the slots, and the width-to-height ratio of the slots is less than approximately 5, and the slots are oriented to the flow to form an angle ranging between 15° and 165°.

The mass transfer device, mass transfer system, and method for mass transfer are suitable for a number of applications, including filtration processes and filters, inertial microfluidics, liquid/liquid and gas/liquid separation, bioreactors and chemical reactors, static mixing, feed delivery, adsorption by activated carbon beds, and dispensing systems. When the application is filtration, the device, system, or method of the invention is particularly useful for filtering particles having a size range between 0.5 microns and 10 mm.

BRIEF DESCRIPTION OF THE DRAWINGS

The following detailed description will be better understood in view of the drawings that depict details of preferred embodiments for a cross-flow filter.

FIG. 9A illustrates a recessed channel along a margin of a slot;

FIG. 9B illustrates undulating and sloped walls along the margins of a slot;

FIG. 9C illustrates protrusions on the margins of a slot;

FIG. 9D illustrates a protrusion on the filter's inner wall immediately upstream of a slot;

FIG. 9E illustrates conduits passed through the filter's wall and terminating at the margins of a slot;

FIG. 9F illustrates protrusions along a slot's exit area that can be angled into the slot or extended across the slot's exit area as needed;

FIG. 9G illustrates a cover spanning between the margins of a portion of a slot at the slot's entrance area;

FIG. 9H illustrates a groove defined along the exterior wall of the filter that is contiguous with the filter's slots;

FIG. 9I illustrates fluid ejection from conduits passed through the filter's wall and terminating at the margins of a slot;

DETAILED DESCRIPTION OF THE INVENTION

Figure 1:
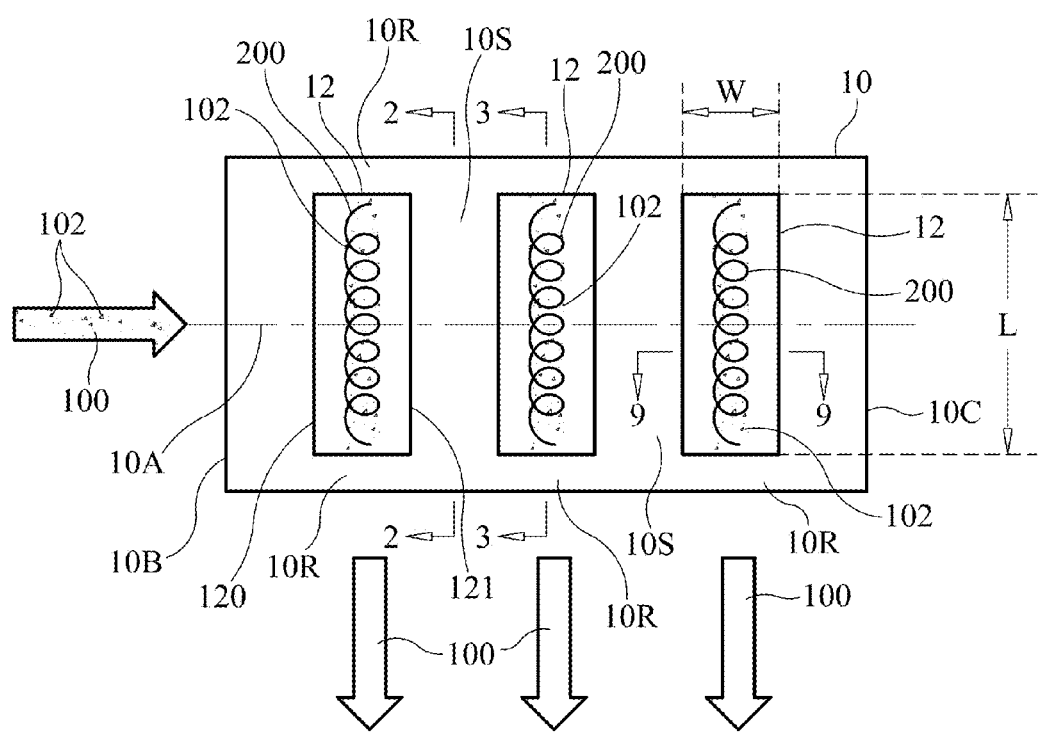
FIG. 1 is a schematic view of a cross-flow filter using slots to generate sustained vortices for particle suspension, concentration, and transport in accordance with an embodiment of the present invention.

Referring now to the drawings and more particularly to FIG. 1, a mass transfer device such as a cross-flow filter 10 uses slots 12 defined in solid wall regions of filter 10 to generate sustained vortex particle suspension in accordance with an embodiment of the present invention. Each slot 12 defines an upstream step or margin 120 at its upstream edge and a downstream step or margin 121 at its downstream edge. The terms "upstream" and "downstream" are referenced to the direction of a fluid flow 100 with particles 102 entrained therein. The height of each margin is defined by the thickness of the solid wall of filter 10 at the margin. The length of filter 10 and the number of slots 12 provided along the length of filter 10 are not limitations of the present invention. Slots 12 can be shaped in a variety of ways without departing from the scope of the present invention. For example, the "plan view" shape of the slots (i.e., as viewed from the illustrated side of filter 10) can be rectangular (as shown), elliptical, V-shaped, or otherwise shaped. The axially-aligned cross-sectional shape of slots 12 can be rectangular, elliptical, triangular, etc., without departing from the scope of the present invention. In general, filter 10 is subjected to a flow of a fluid 100 (i.e., liquid or gas) with particles 102 entrained therein, causes the generation of sustained vortices 200 in slots 12 to thereby entrain and concentrate particles 102 within the vortices, and allows a flow of fluid 100 with particles 102 substantially or completely removed to exit filter 10.

Figure 2:
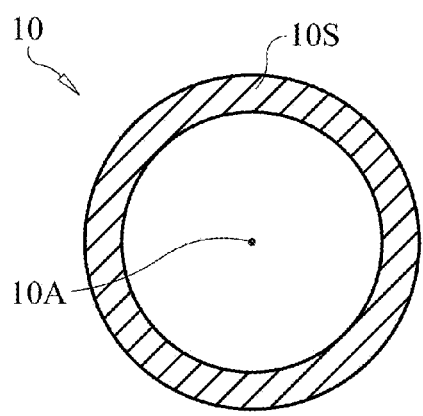
FIG. 2 is a cross-sectional view taken along line 2-2 in FIG. 1 illustrating the solid portion of a tubular-type of filter in accordance with an embodiment of the present invention.
Figure 3:
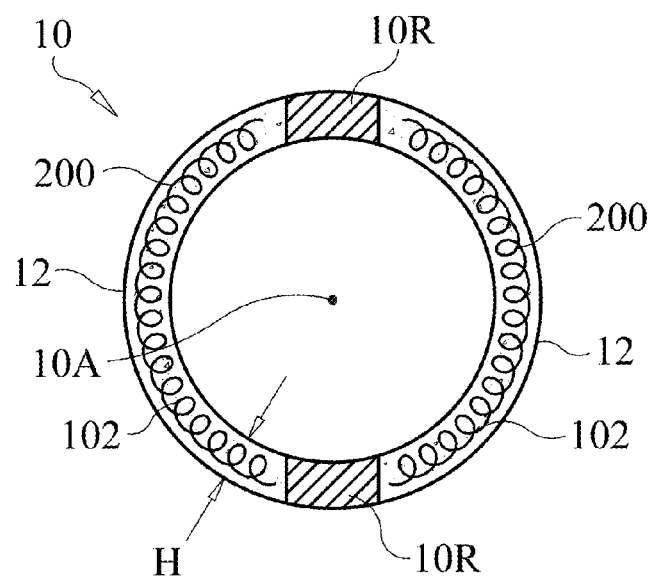
FIG. 3 is a cross-sectional view taken along line 3-3 in FIG. 1 illustrating slot region portions of a tubular-type of filter in accordance with an embodiment of the present invention.

In one embodiment of the present invention, filter 10 can be constructed as a tube having a longitudinal axis 10A. Fluid 100 with particles 102 entrained therein is provided under pressure (e.g., pumped, gravity-fed, etc.) to filter 10 along longitudinal axis 10A at an open end 10B. The diameter of open end 10B can be any diameter from approximately 5 microns to 10 meters or more. Fluid 100 with particles 102 entrained therein can be delivered as a continuous flow, pulsatile flow, or oscillatory flow. Each of slots 12 is defined in a wall of the tube such that fluid 100 with particles 102 flows tangentially along the wall with slots 12 defined therein. By way of example, it will be assumed for the current description that filter 10 is a cylindrical tube such that there are axially-extending solid cross-sectional regions 10S as shown in FIG. 2, and axially-extending partially-open cross-sectional regions defining slots 12 through the walls of tube/filter 10 as shown in FIG. 3. Solid rib regions 10R can be used to maintain structural integrity of filter 10 in the regions thereof where slots 12 are defined. The thickness of solid regions 10S and 10R as shown in FIG. 2 and FIG. 3 can vary. In the illustrated embodiment, slots 12 are provided on both radial sides of filter 10. However, it is to be understood that slots 12 could be provided on one side of filter 10 without departing from the scope of the present invention. As an additional option, the location of the slots can be staggered, i.e., the upstream/downstream slot locations on opposing radial sides of the device are staggered. The opposing longitudinal end 10C of filter 10 can be partially or fully closed to affect the amount of fluid 100 with no particles 102 or few particles 102 (represented in the figures by unfilled arrows 100) that exits filter 10 radially via slots 12.

In accordance with the present invention, the width "W" (FIG. 1) and height "H" (FIG. 3) of each slot 12 are such that the width-to-height ratio "W/H" is approximately 5 or less. The length "L" of each slot should be approximately three times or more the slot's width W. Length L is measured along the curved shape of the slot when the filter is tubular or a curved sheet of material. Length L is a straight line measurement when the filter is a planar sheet of material. Each slot 12 is oriented in the fluid flow such that its length dimension is non-parallel with respect to the direction of the fluid flow moving over the slot. For example, in FIG. 1, slots 12 are oriented perpendicular to flow 100 with particles 102 entrained therein. Acceptable ranges of slot orientation will be explained further below. When these relationships are maintained, sustained vortices 200 are generated in the slot regions of the filter's walls where such vortices entrain, concentrate, and transport particles. That is, as fluid 100 with particles 102 entrained therein flows axially through filter 10, a cross-flow scenario at the upstream/downstream margins 120/121 of each slot 12 causes sustained vortices 200 to form within the slots. Thus, the combination of filter 10 and the flow of fluid 100 with particles 102 entrained therein define a novel mass transfer system. In this mass transfer system, the slot-supported vortices 200 entrain, concentrate, and transport particles 102 in slots 12 so that primarily fluid 100 with little or no particles 102 exits radially from filter 10 via slots 12 (as illustrated herein by unfilled arrows 100). Since particles 102 are suspended in vortices 200, they typically do not form a clogging mass in slots 12. The width W, height H, and width-to-height ratio W/H of slot 12 can vary within and among the slots of filter 10. As mentioned above, the plan view of a slot can be rectangular, elliptical, etc. When a slot is rectangular, its width W is constant along the slot's length. For a non-rectangular slot, the width W over approximately 75% of the slot's length should be defined by an average width (satisfying the above W/H ratio) that can vary by a marginal amount approximately equal to 20% of the average width. The width W over approximately 25% of the slot's length can vary by more than 20% of the average width.

Figure 4:
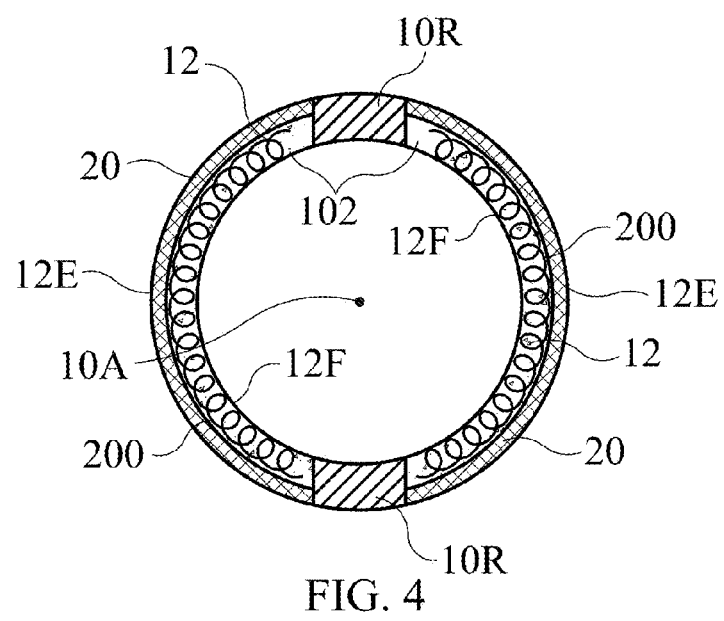
FIG. 4 is a cross-sectional view of a tubular-type of filter incorporating porous membranes at the slot exits in accordance with another embodiment of the present invention.

To constrain sustained vortices 200 within their corresponding slots 12 and ensure that suspended particles 102 do not exit slots 12 (along with fluid 100 exiting slots 12), it may be desirable to partially or fully "cover" the exit of each slot 12 with a porous membrane. Accordingly, FIG. 4 illustrates a cross-sectional view of a tubular-type of filter 10 that includes porous membranes 20 across all or part of the exit area 12E of each slot 12. Porous membranes 20 can be in the form of a mesh or other structure that provides a selective barrier. Further, the pores of porous membranes 20 can be sized to capture any of particles 102 that leave a sustained vortex 200. Since the number of such particles 102 leaving vortex 200 will be small, porous membranes 20 will not typically be subject to clogging.

For each slot 12, a slot's entry area 12F is defined at a filter's inside wall and a slot's exit area 12E is defined at the filter's outside wall. In general, for closed-end tubular filters, the vortices are sustained in the filter's slots when each slot exit area 12E is equal to or greater than its entry area 12F. The specifics of this relationship will vary depending on the device's application. For a cylindrical filter where each slot's entry area approximately equals the slot's exit area, the ratio of the area of the filter's open end 10B to the total area of all exit areas 12E (i.e., not including any area obstructed by solid portions of porous membranes 20 or other blockages) can be approximately 1.0 for many filtration applications.

Figure 5:
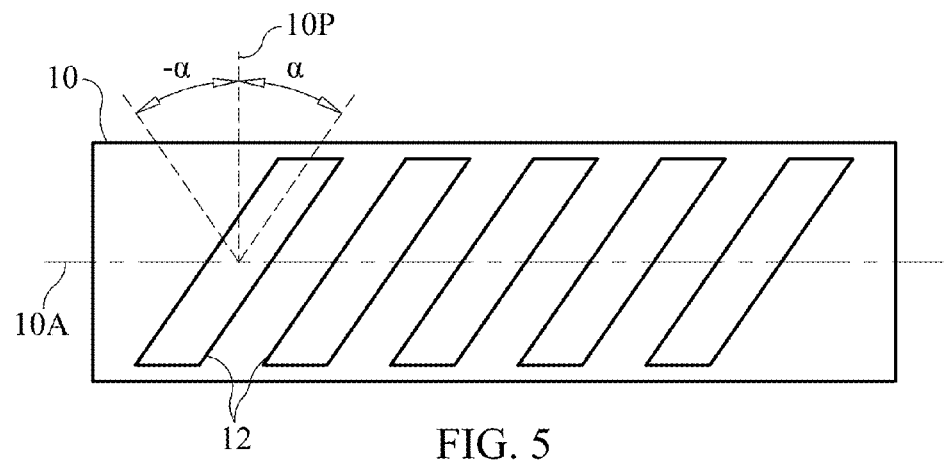
FIG. 5 is a side view of a tubular-type of filter incorporating pitched slots in accordance with another embodiment of the present invention.

As mentioned above, the length dimension of the slots in a device of the present invention can be perpendicular to the direction of the fluid flow moving over the slot (as shown in FIG. 1) or angled with respect thereto (as shown in FIG. 5) where the length dimension of each slot 12 forms an angle α with a direction 10P that is perpendicular to the fluid flow direction, i.e., perpendicular to the longitudinal axis 10A of filter 10. The pitch angle α can range from approximately −75° to approximately 75° relative to the direction 10P that is perpendicular to the fluid flow direction.

Figure 6:
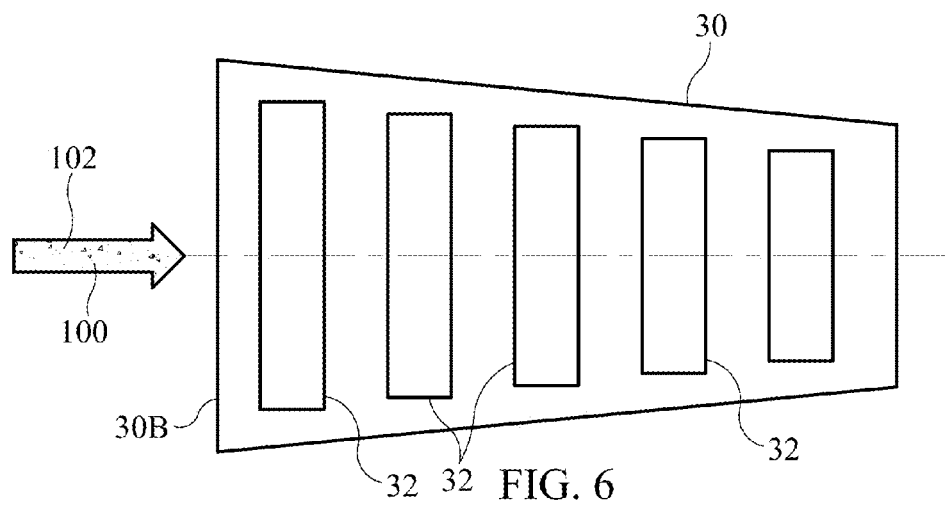
FIG. 6 is a side view of a conical tube filter in accordance with another embodiment of the present invention.

The tube shape used in the present invention is not limited to a cylindrical tube. For example, a conical tube can be optimal for many filtration applications, wherein the angle of inclination of the cone walls relative to the tube's longitudinal axis affects the shape and size of vortices 200. Accordingly, FIG. 6 illustrates a conical tube 30 where a larger diameter open end 30B of the cone serves as the entry point for fluid 100 with particles 102 entrained therein. Slots 32 can also be pitched relative to the fluid flow direction as described above and shown in FIG. 5. To generate sustained vortices for particle transport in slots of closed-end conical tubular filters, it has been found that a slot's exit area needs to be greater than the slot's entry area, and in preferred embodiments, the total of all slot exit areas is approximately 1.3 to 2.2 times the area of the filter's open end (e.g., open end 30B). The tube shape is not limited to being cylindrical or conical, but can have other cross-sectional shapes (e.g., rectangular, square, regular or irregular shapes, etc.) without departing from the scope of the present invention.

Figure 7:
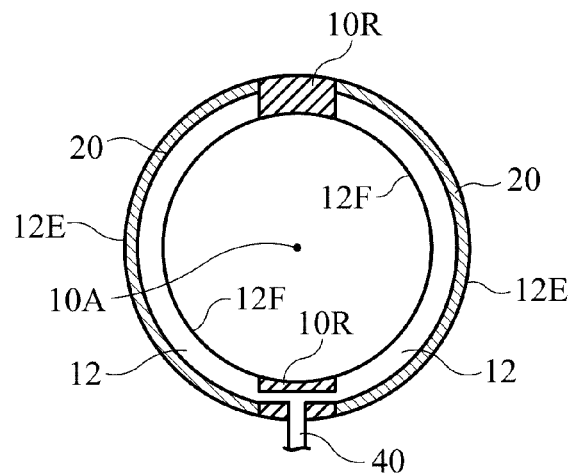
FIG. 7 is a cross-sectional view taken along line 3-3 in FIG. 1 illustrating slot region portions of a tubular-type of filter with conduits provided in the ribs thereof for particle removal in accordance with another embodiment of the present invention.
Figure 8:
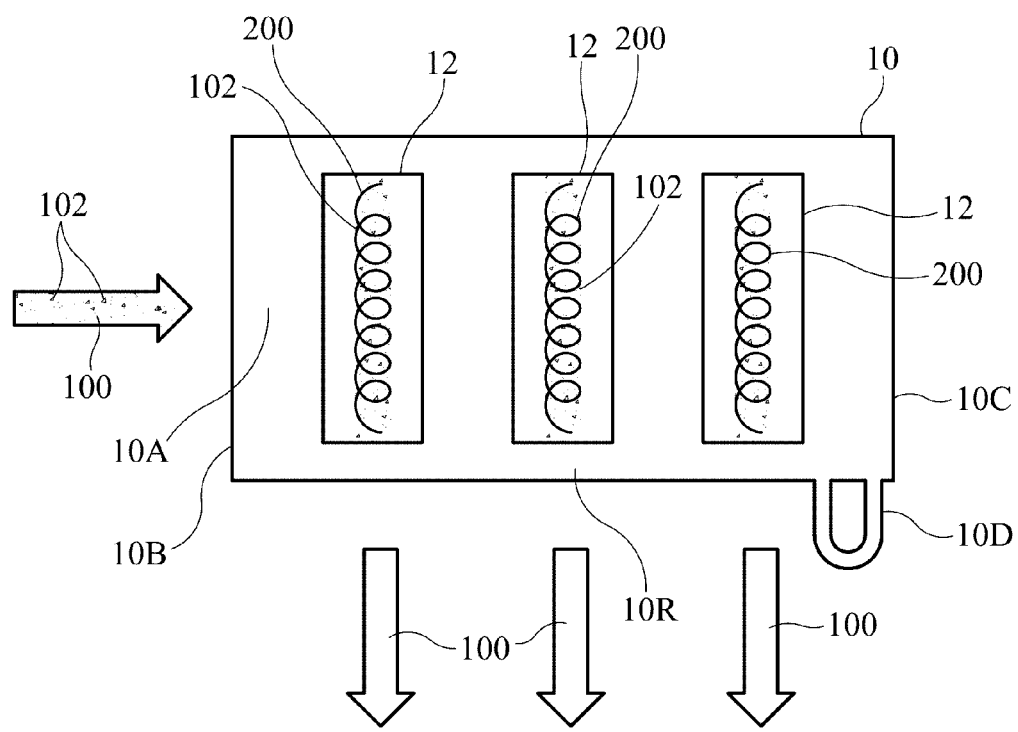
FIG. 8 is a schematic view of a cross-flow filter using slots and incorporating a trap at one end thereof for the collection of particles in accordance with another embodiment of the present invention.

Filters constructed in accordance with the present invention could also incorporate structures or systems designed to collect particles during fluid flow or when the fluid flow is slowed or stopped. Such structures or systems could be active or passive in nature. For example, FIG. 7 is a cross-sectional view taken along line 3-3 in FIG. 1 illustrating the inclusion of a conduit 40 defined through rib 10R to allow for the active suction of particles 102 from the vortex 200 at one end of each slot 12. Another option is illustrated in FIG. 8 where end 10C of tube/filter 10 could incorporate a curved or shaped section at 10D to allow particles to passively settle therein, much like a plumbing trap employed in drain lines.

Figure 9A:
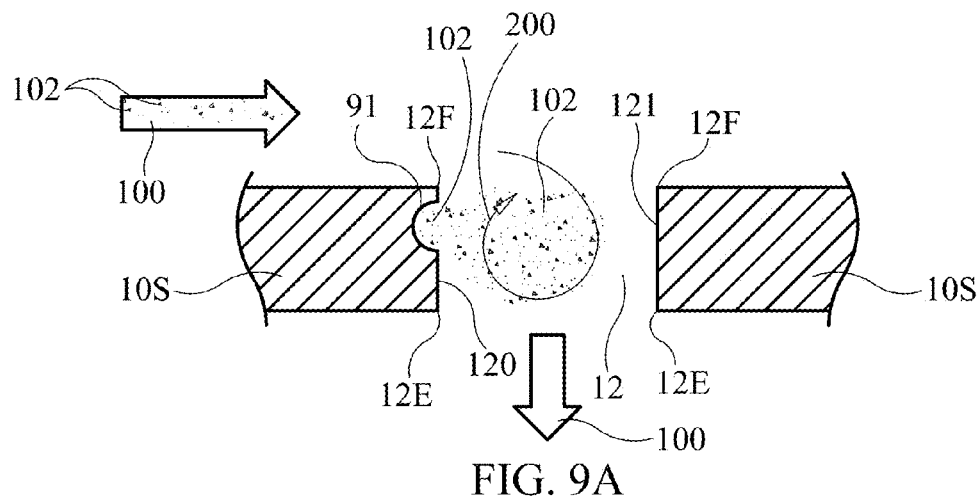
FIGS. 9A-9I are cross-sectional views taken along line 9-9 in FIG. 1 illustrating additional embodiments of the present invention where

Additional features that can be incorporated into devices of the present invention are illustrated in FIGS. 9A-9I where each illustration is a view taken along line 9-9 in FIG. 1 to illustrate a cross-section of a slot 12 and its upstream/downstream margins 120/121 defined by opposing solid regions 10S. The features presented below can be used singly or in one or more combinations thereof without departing from the scope of the present invention. In FIG. 9A, a recessed channel 91 is defined along the length of upstream margin 120 for the aggregation of particles 102 leaving vortex 200. A similar channel could be provided additionally or alternatively in downstream margin 121. The number and locations of such channels in margins 120 and/or 121 are not limitations of the present invention. For clarity of illustration, the remainder of FIGS. 9B-9I omit any showing of fluid flow 100 with particles 102 entrained therein, vortex 200 with particles 102 suspended therein, and fluid 100 will little or no particles 102 therein exiting slot 12.

Figure 9B:
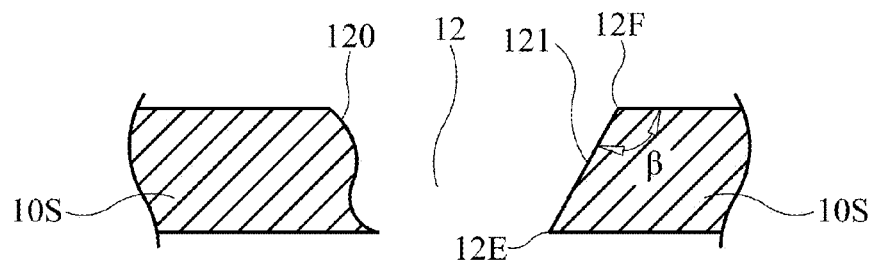
Figure 9C:
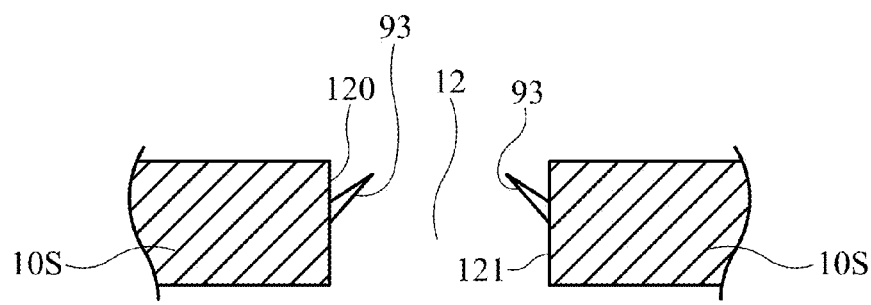
Figure 9D:
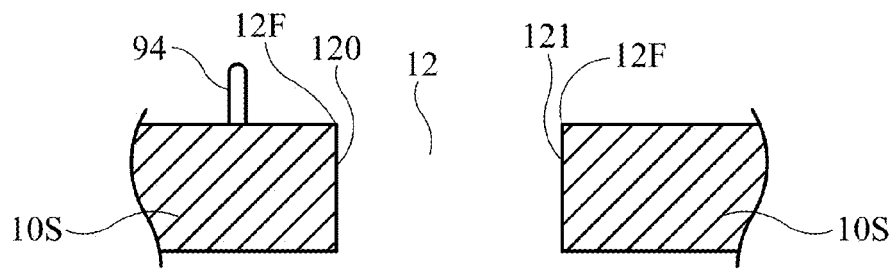

In FIG. 9B, upstream margin 120 defines an undulating surface that essentially defines multiple adjacent channels for aggregating particles leaving a vortex in slot 12, while downstream margin 121 defines an angled slope with respect to the flow direction of the fluid with particles entrained therein. The undulating surface could be used additionally or alternatively on downstream margin 121, while the angled slope surface could be used additionally or alternatively on upstream margin 120. The angle β defining the slope of the margin at either entry area 12F (as shown) or exit area 12E should be in the range of approximately 30° to 150°. In preferred embodiments for transporting particles, the angle β should be in the range of approximately 90° to 150°. For tubular filtration systems, when the angle β is in the range of approximately 30° to 90°, particles can be effectively entrained and concentrated, but transport of the particles is problematic relative to otherwise equivalent filtration systems having an angle β in the range of approximately 90° to 150°. In FIG. 9C, protrusions 93 are provided on upstream/downstream margins 120/121. In FIG. 9D, one or more protrusions 94 are provided on the inside wall of filter 10 just upstream of margin 120. Protrusions 93 and/or 94 can be used to passively control the location of vortices in slot 12, concentrate particles in the vortices, and cause/control the release of particles back into the cross-flow moving over slot entry areas 12F. Protrusions 93 and protrusions 94 can be of varying shape, size, and location. Rows of protrusions 93 on upstream margin 120 of each slot 12 can cause the formation of vortices and the concentration of particles near the location of protrusions 93, particularly when the width W (FIG. 1) and height H (FIG. 3) of each slot 12 are such that the width-to-height ratio W/H is less than 1. In one embodiment, this design can be employed as an inertial microfluidics device for the filtration of particles less than approximately 50 microns, e.g., cells.

Figure 9E:
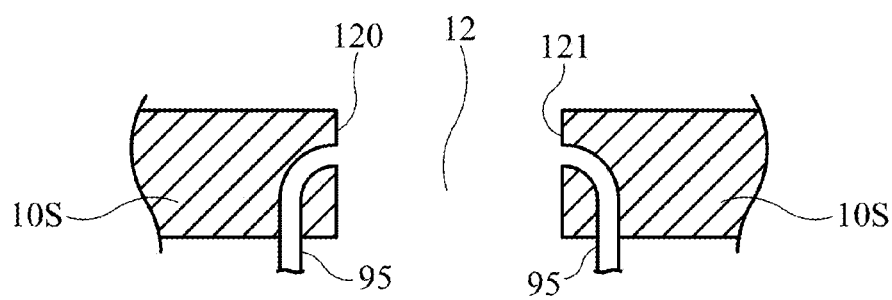
Figure 9F:
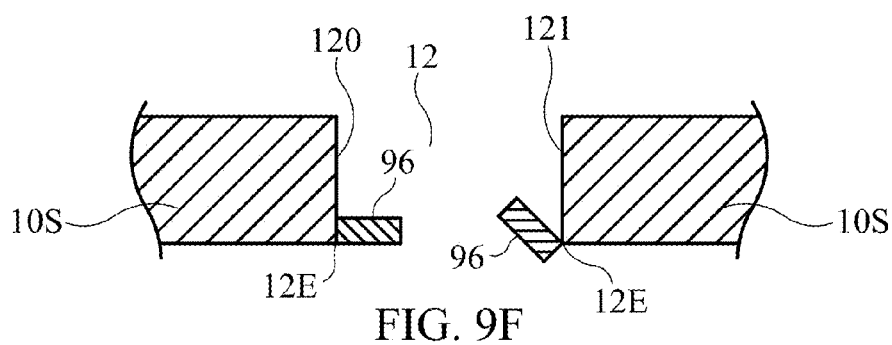

Another possible feature is illustrated in FIG. 9E where open-ended conduits 95 terminate at upstream/downstream margins 120/121. A suction force applied to conduits 95 can be used to actively control the location of a vortex in slot 12 and collect particles leaving the vortex. Conduits 95 are representative of single or multiple conduits. For example, the open ends of multiple conduits can be grouped together to form a porous surface along one or both of margins 120/121. FIG. 9F illustrates another option where one or both of upstream/downstream margins 120/121 at exit area 12E of slot 12 have an exit area protrusion 96 coupled thereto. Protrusions 96 can be a mesh disposed along some or all of the length of slot 12 to concentrate particles or a solid material to transport particles in a vortex in slot 12, and can be perpendicular to the corresponding margin or angled into slot 12.

Figure 9G:
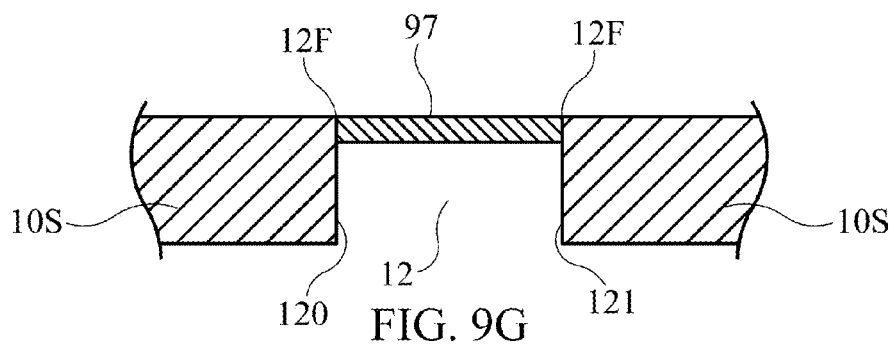
Figure 9H:
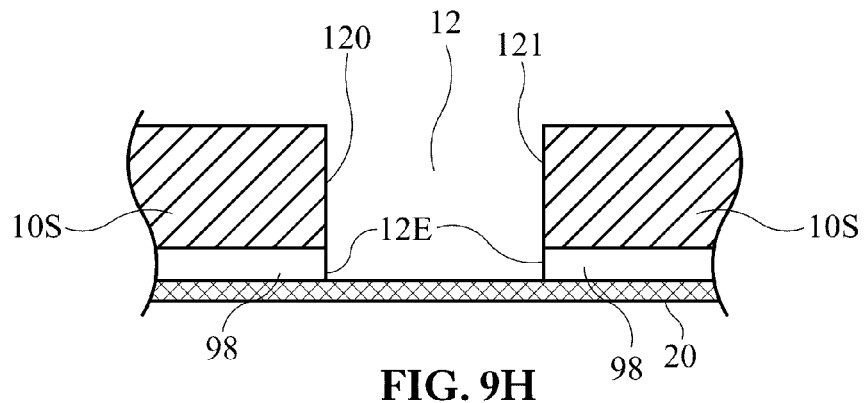
Figure 9I:
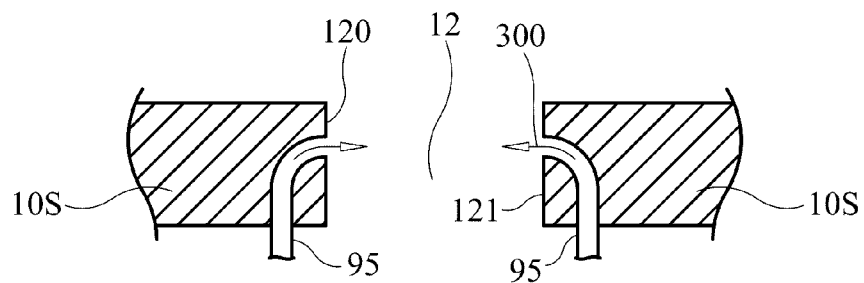

In FIG. 9G, a cover 97 spans between margins 120 and 121 at a slot's entry area 12F to allow particles to concentrate beneath cover 97. Typically, cover 97 covers a selected portion of a slot's entry area 12F to facilitate the collection of particles leaving a vortex in the slot. FIG. 9H illustrates a groove 98 of variable length and angle defined along the exterior wall(s) of filter 10. Multiple grooves 98 can be provided in a side-by-side fashion about the periphery of filter 10. Each groove 98 is contiguous with slots 12 (at exit area 12E) and may be partially or fully covered by a porous membrane 20. Vortices in slot 12 direct particles into groove 98 for concentration and collection thereof on porous membrane 20, or for discard or collection of the particles external to filter 10. FIG. 9I illustrates another option where the previously-described conduits 95 are used to inject a polymer 300 into slot 12 where polymer 300 is drawn into the slot's vortex where it binds to particles suspended in the vortex to facilitate transport thereof.

Figure 10:
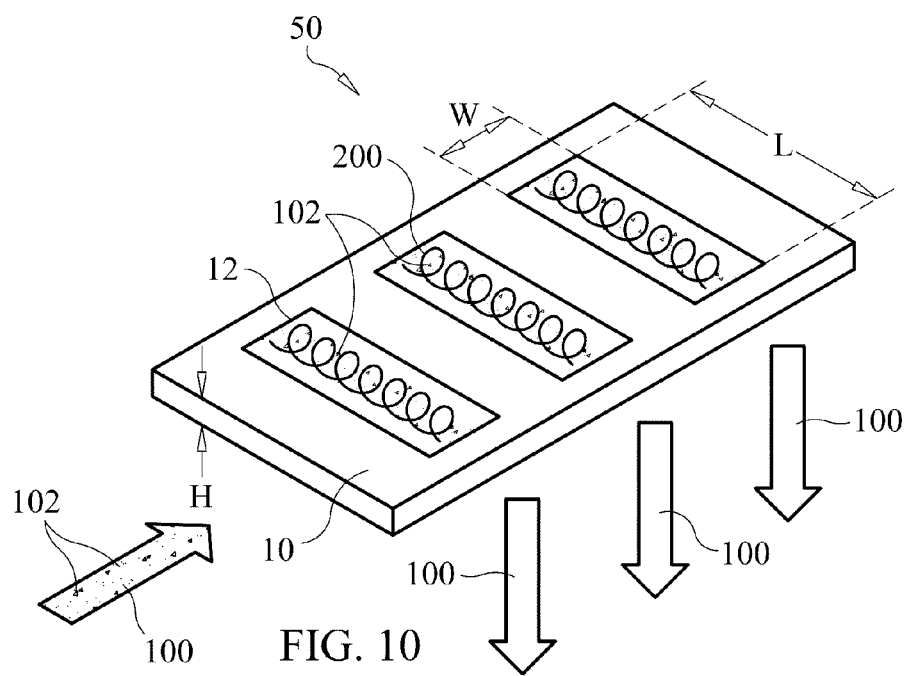
FIG. 10 is a perspective view of a sheet filter in accordance with another embodiment of the present invention.

The present invention is not limited to tubular filter configurations. Accordingly, FIG. 10 illustrates another embodiment of the present invention in which a filter 50 is made from a sheet of material (e.g., a flat planar sheet, a curved sheet, etc.) with slots 12 defined in the wall of the sheet. Unfiltered fluid 100 with particles 102 entrained therein flows over the sheet and is filtered through the slots, with the filtrate fluid 100 exiting beneath the sheet. In this embodiment, the height H of each slot 12 is defined by the thickness of the sheet. The angle of inclination of the sheet relative to the direction of unfiltered fluid affects the size and shape of vortices 200. It is to be understood that the principles and additional options described herein also apply to sheet filter 50.

Figure 11:
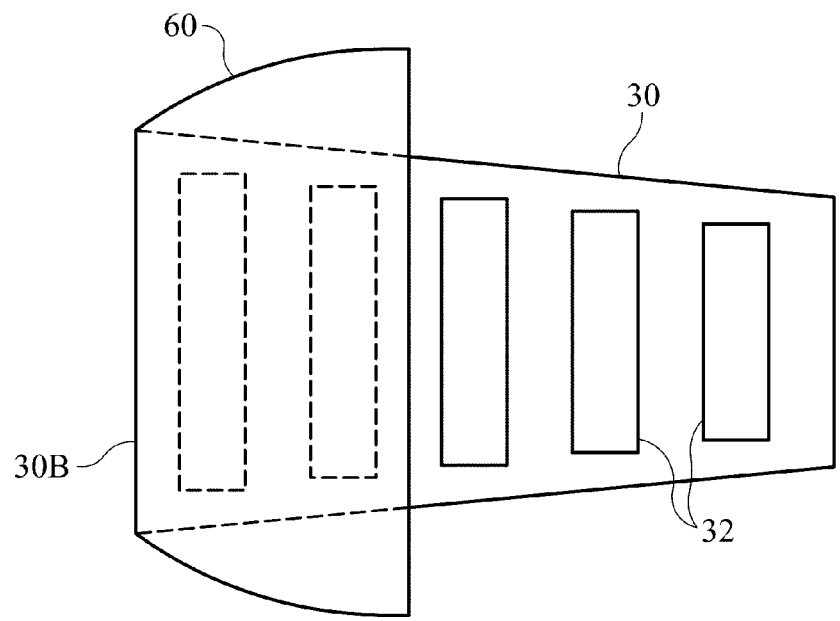
FIG. 11 is a side view of a conical tube filter with a skirt attached to the rim of the inflow region on the conical tube in accordance with another embodiment of the present invention.

Pressure differentials can exist between the interior of tubular filters of the present invention and the exterior of the filter, between different regions along the interior of the filter, and between different regions along the exterior of the filter. These pressure differentials and the corresponding rate of fluid flow exiting from the slots can be modulated independently using mechanisms such as pumps, suction, internal or external filter dimensions including wall thickness, and/or structures on or around the exterior of the tube or sheet that affect internal or external fluid flow velocity. These pressure differentials can be used to control the filtration rate at various locations along the filter, and can also be used to control the rate and direction of fluid and particle transport along the interior and/or exterior of the filter. For example, FIG. 11 illustrates another embodiment of the present invention where a tubular filter (e.g., the above-described filter 30) has a flexible or rigid skirt 60 attached to the rim of open end 30B to control the pressure differentials. The length of skirt 60 (i.e., along the length of filter 30) and its bloused shape can be adjusted based on the requirements/goals of a particular application.

Figure 12:
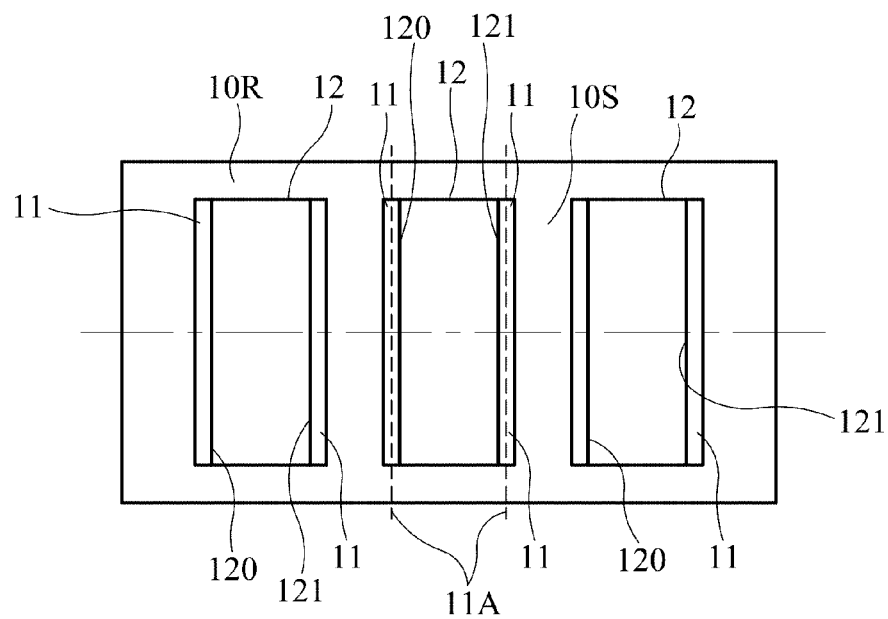
FIG. 12 is a perspective view of a sheet filter having slots whose upstream/downstream margins are defined by pivoting louvers in accordance with another embodiment of the present invention.

In another embodiment, FIG. 12 illustrates louvered portions 11 of solid cross-sectional regions 10S that can be used to define the upstream/downstream margins 120/121 of a slot 12. More specifically, each of louvered portions 11 is supported to provide for pivoting motion about its longitudinal axis 11A. Titling of louvered portions 11 can be used to provide dynamic control of vortices and prevent clogging. Active tilting of louvered portions 11 over an approximate range of β=30° to 150° alters the slope of slot's upstream/downstream margins (e.g., see downstream margin 121 in FIG. 9B) thereby altering the size, location, and speed of the vortices and associated cross-flow that scour a slot-covering membrane and transport particles in slot 12. Louvered portions 11 could be attached to cross-sectional regions 10S and/or 10R using flexible hinges that tilt passively in response to pulsatile or oscillatory flow. In combination with pressure sensors mounted inside the filter, dynamic control of slot wall rotation can be automated to prevent clogging. Louvered portions 11 could be pivoted in unison or independently without departing from the scope of the present invention.

Figure 13:
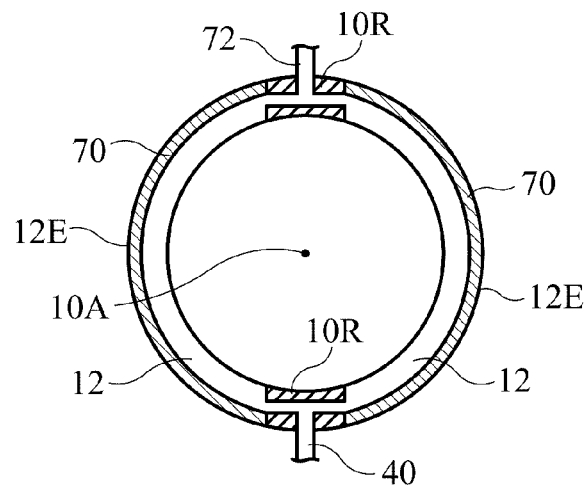
FIG. 13 is a cross-sectional view taken along line 3-3 in FIG. 1 illustrating slot region portions of an open-ended tubular-type of inertial microfluidics device with a solid material covering all or part of the exit area of the slots in accordance with another embodiment of the present invention.

Another embodiment is depicted in FIG. 13 where a cross-sectional view taken along line 3-3 in FIG. 1 illustrates slot region portions of a tubular-type of filtration device that is open at both ends thereof in order to employ inertial microfluidics. A solid material 70 covers all or part of the exit area 12E of slots 12 to direct particle-laden vortices in slot 12 towards conduits 40 inserted through solid rib regions 10R at one side of the device as previously shown/described in FIG. 7. To provide for continuous vortical flow in slots 12 without disrupting the inertial migration of cells or micron-sized particles into the slots, conduits 72 can be provided through solid rib regions 10R along one side of the filter and used to supply additional fluid influx into slots 12.

Figure 14:
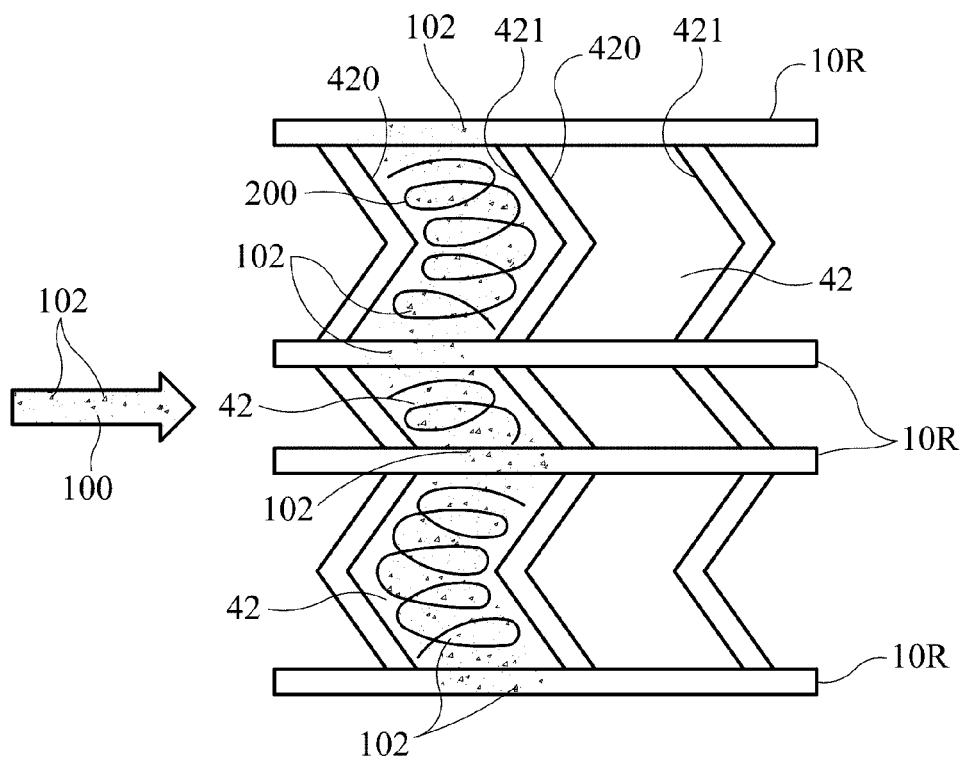
FIG. 14 is a schematic view of a sheet having angled and V-shaped slots defined therein in accordance with another embodiment of the present invention.

In the embodiment depicted in FIG. 14, V-shaped slots and/or angled slots 42 are defined between upstream/downstream margins 420/421 thereby creating converging-diverging surface roughness in a herringbone pattern to direct the fluid and particles 102 in vortices 200, while minimizing drag along a sheet or a tube-like structure. For clarity of illustration, the resulting vortices 200 with suspended particles 102 are only shown in some of slots 42. Solid rib regions 10R can be used for structural integrity and to provide regions of transport for particles 102 leaving vortices 200. This pattern can be used for a filtration surface that provides low drag in fluid transport.

The devices described herein can be part of a mass transfer system such as a cross-flow filtration system in which, for example, a mixture of solid particles and a liquid is introduced into a cross-flow filter device as described herein. A force, for example, gravity, suction, or pressure, is used to induce flow of the mixture through the filter device, which separates the mixture into filtrate portions and retained portions. The filtrate portion contains a reduced concentration of solid particles relative to the starting mixture, while the retained portion contains a greater concentration of solid particles relative to the starting mixture.

The advantages of the methods, devices, and mass transfer systems using the devices described herein are numerous. The structure of the slots allows for the passive generation and dynamic control of sustained vortices that direct mass within the slots, wherein the phrase "direct mass within the slots" means to suspend, concentrate, and/or transport mass within the slots. In industrial processes requiring the controlled movement of mass, fluid can be pumped, suctioned, or gravity-fed along tube or sheet walls with slot(s) as defined. Particles can be suspended and concentrated passively in vortices for directional transport within the slots to the subsequent stage in the process. The various structural embodiments described herein can be tailored to meet the needs of the specific industrial process. Solids, liquids, and gases can be separated from the carrier fluid. The carrier fluid can be a liquid or a gas. Particles that are more dense than the carrier fluid can be concentrated and transported in the outer regions of the vortices along the margins of a slot. Small particles such as cells, as well as gas bubbles, liquids (emulsified or non-emulsified), and other particles that are less dense than the carrier fluid, can be concentrated and transported in the center of the vortices. The structural features of the invention enable manipulation of the vortices within the slot to deliver separate fluid streams when needed, including unfiltered fluid, filtered fluid lacking particles, fluid concentrated with larger particles or particles denser than the fluid, and fluid concentrated with smaller particles or particles less dense than the fluid.

Mass transfer using slot-based particle suspension/concentration has numerous advantages. The invention passively generates controlled, sustained vortices in slots over significant portions of the entire device surface. The device and mass transfer system using the device can be designed to suspend, concentrate, and transport particles in vortices within the slots as needed for the specific application. Fluid-entrained particles can remain suspended in the vortices for transport and/or can be directed to be ejected from the vortices for concentration in certain regions of the device. The basic design is highly flexible and can be modified readily to suit the application. The invention can alternate between operation in a static mode with no moving parts and a dynamic mode (e.g., by changing slot wall angles or wall porosity) in response to pressure changes. The device can reduce energy expenditure as needed through dynamic control to maintain operation at comparatively low pressures (e.g., low transmembrane pressure). In embodiments wherein the structure is a cross-flow filter, concentration polarization and clogging of the filter surface are reduced, as is loss of the particles with the filtrate. Additional advantages of this design are that generated vortices enable the use of filtration pore sizes that are approximately the size of the particle to be filtered, and even allow substantial filtration with a large hole or holes in the filtration membrane for operation at low transmembrane pressures. Pore sizes or significant holes that are larger than the size of the particle to be filtered can be used when some loss of particles with the filtrate is acceptable, thereby allowing filters described herein to be used as rapid and high-volume pre-filters. The filter inlet can range from approximately 5 microns to 10 meters or more in diameter thereby making the filter suitable for a wide variety of applications. The structural dimensions, inlet flow parameters, and Reynolds number can be adjusted at different scales of operation to generate vortices that cover the optimal amount of filtration surface at the optimal pressure for the application.

EXAMPLES

The examples that follow are intended in no way to limit the scope of this invention but instead are provided to illustrate representative embodiments of the present invention. Many other embodiments of this invention will be apparent to one skilled in the art.

Prototype Example 1

Figure 15:
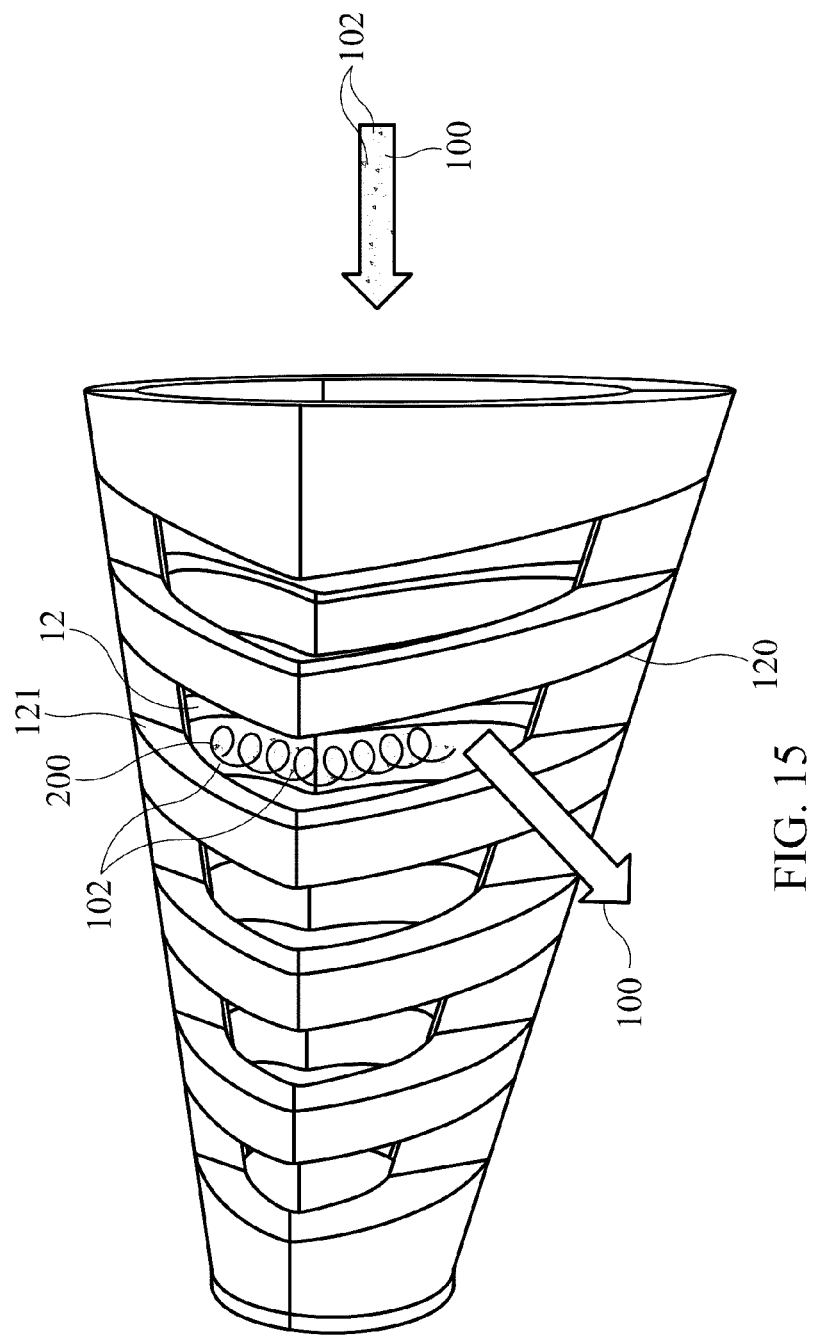
FIG. 15 is a CAD drawing perspective view of a mass transfer device in accordance with an embodiment of the present invention.

A filter prototype with slots having a width/height ratio ranging from 0.9 to 1.5, shown in FIG. 15, was designed using a CAD program. A model of this CAD-designed filter was 3D-printed in plastic and covered by a nylon mesh with a pore size of 140 microns. While this filter was made from plastic, other plastics and non-plastics (including but not limited to metals, ceramics, and non-thermoplastic polymers) would also be suitable materials for the filter.

The model was submerged in a recirculating flume with water flowing continuously through and around the model at a rate of 30 cm/sec. A clear plastic skirt was attached to the rim of the model at its flow inlet (as shown schematically in FIG. 11) to control the pressure differential between the water flowing inside vs. outside the model. Concentrated helical vortices were generated passively by each slot and were sustained continuously between the slot margins, interior to the mesh membrane that covered the slots. The vortices were visualized using rhodamine dye injected to the interior of the model through aluminum probes in the walls of the filter immediately upstream of the slots.

Figure 16:
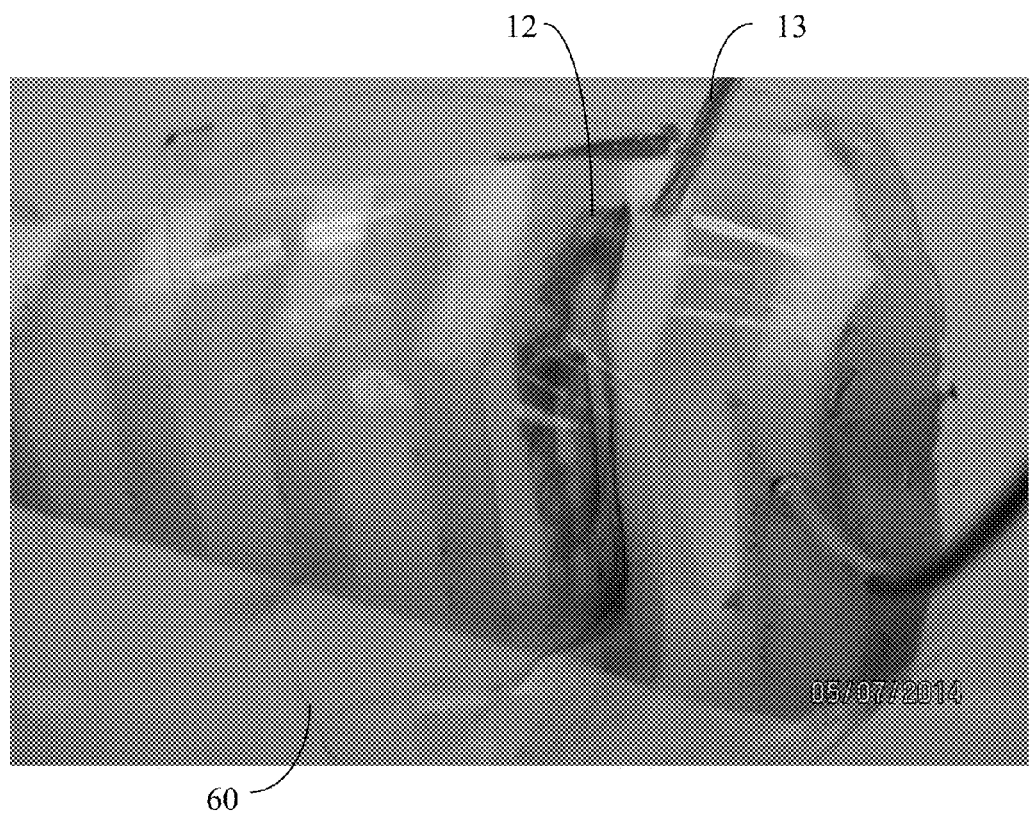
FIG. 16 is a photographic image of a prototype mass transfer device with a skirt attached to its inlet.

A photographic image of the above-described model being tested is shown in FIG. 16. One primary vortex formed inside each slot, with an axis that extended along the length of the slot. FIG. 16 illustrates flow around the core of the vortex in the filter's second slot (referenced by numeral 12), with the core being located near the central axis of slot 12. The flow is indicated by dye injected just upstream of the second slot 12 via a probe 13 fed through the wall of the model. The dye appears as the dark areas in slot 12 and can be seen exiting the slot near the bottom of the model. Water that entered the second slot 12 then exited to the right or left of this vortex along the upstream/downstream slot margins where the porous membrane covering the slots contacted the margins of the slot. The pressure differential created by external plastic skirt 60 caused the vortices to travel unidirectionally within the slots along the vortex axes towards the bottom of the model.

Figure 17:
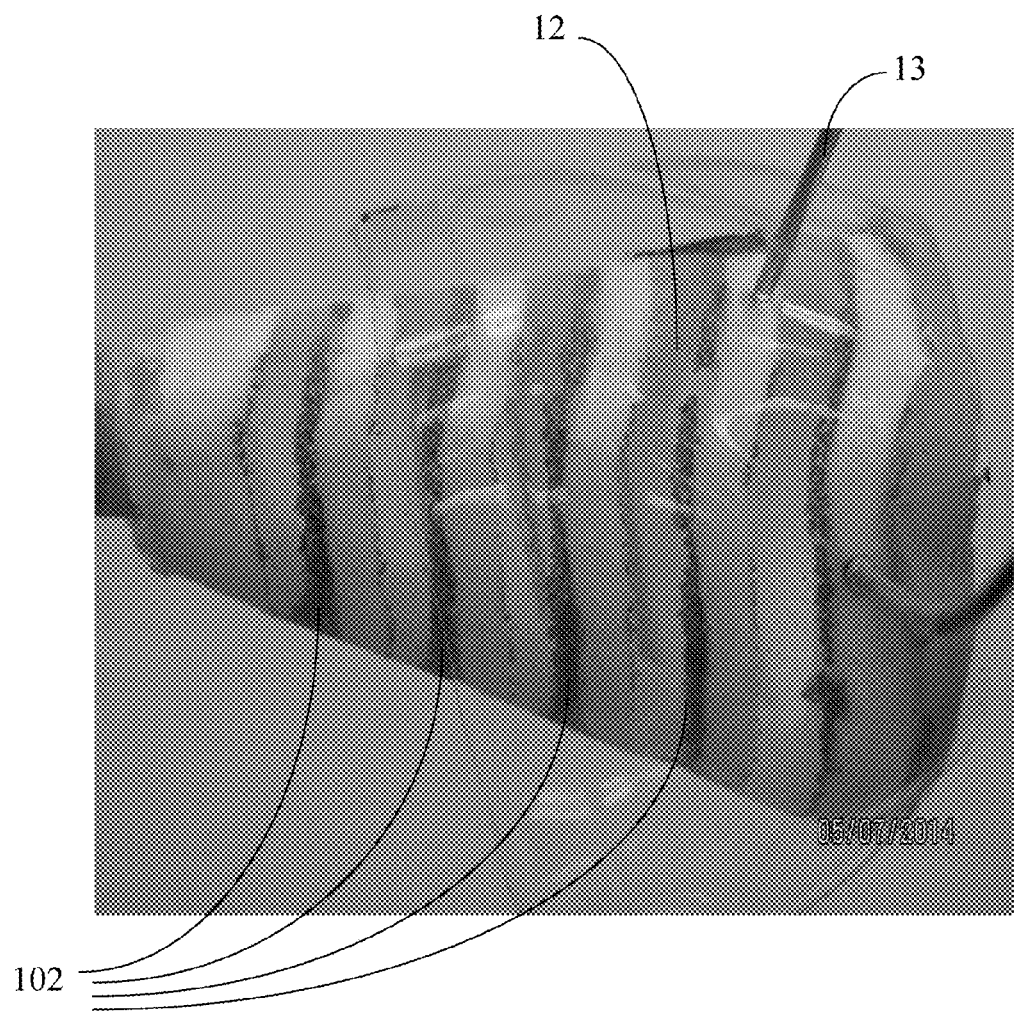
FIG. 17 is a photographic image of a prototype mass transfer device used for filtration illustrating concentrations of particles along the margins of all slots.

When the water entering Prototype Example 1 contained particles with a diameter of 200 microns (e.g., brine shrimp eggs), the primary vortex and the cross-flow beneath the vortex scoured the mesh along the central axis of each slot. This rapid flow from posterior to anterior across the mesh prevented particles from accumulating near the central axis of each slot. Instead, particles that were ejected by this primary vortex concentrated along the slot margins, mainly along the anterior margin of each slot. As water exited along the anterior and the posterior margins of the slot, the particles that had been suspended by the vortex and the cross-flow accumulated on the mesh. The accumulated particles are illustrated in FIG. 17 by the dark regions referenced by numeral 102.

Prototype Example 2

Prototype Example 2 used the same prototype filter and experimental set-up as was used as in Prototype Example 1, except in this case a clear solid polymer film 96 was positioned along the first and second slots' upstream exit areas where each piece of film covered a small fraction of each slot similar to the schematic design illustrated in FIG. 9F. A mixture of water and 200 micron particles was applied to the inflow of the filter, and the resulting particle distribution was analyzed.

Figure 18:
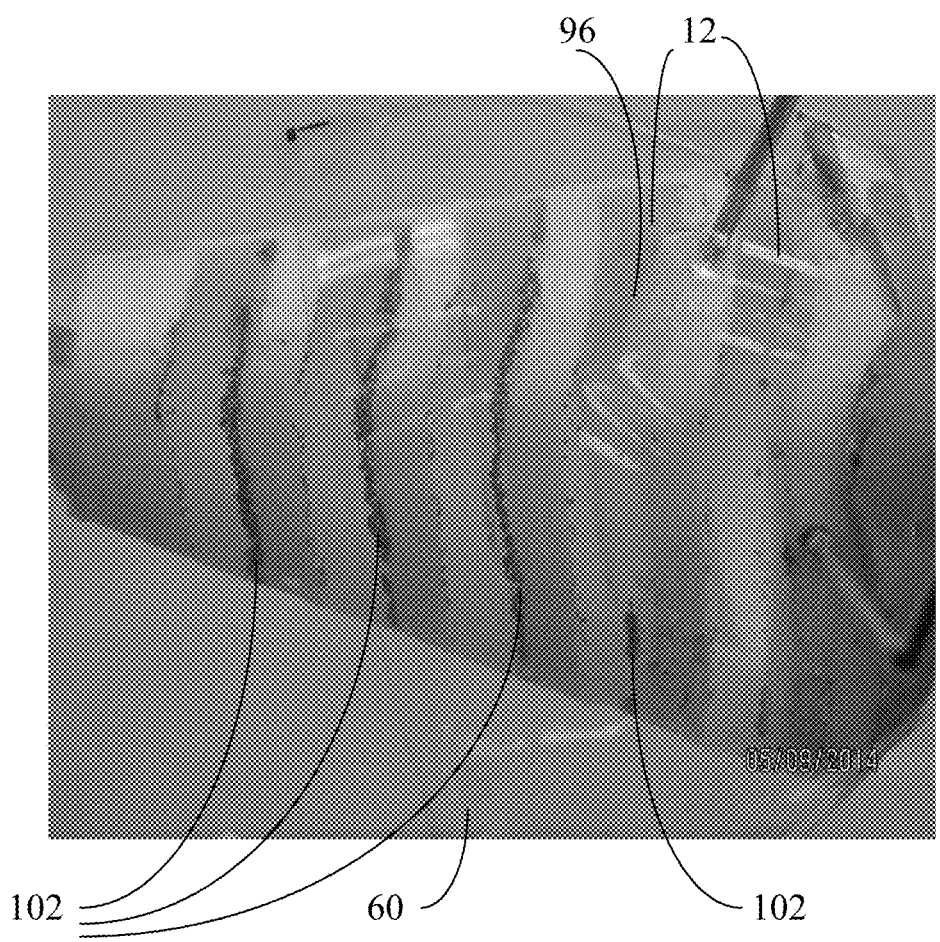
FIG. 18 is a photographic image of a prototype mass transfer device used for filtration illustrating a reduction in particle concentration along the margins of two of the slots due to particle transport.

As shown in FIG. 18, Prototype Example 2 reduced particle accumulation on the external mesh membrane by causing the primary vortex to transport particles along the solid anterior margins of the first two slots 12 towards the bottom of the model. In experiments, these transported particles were either allowed to return to the flow inside the model or alternatively were suctioned from the bottom of the anterior slot margins. Build-up of particles at the remainder of the filter's slot margins are referenced by numeral 102. Notably, by modifying the filter design to partially cover the exit area of a given slot with a solid film, the filtration efficiency at those slots improved by nearly two orders of magnitude.

Prototype Example 3

Figure 19:
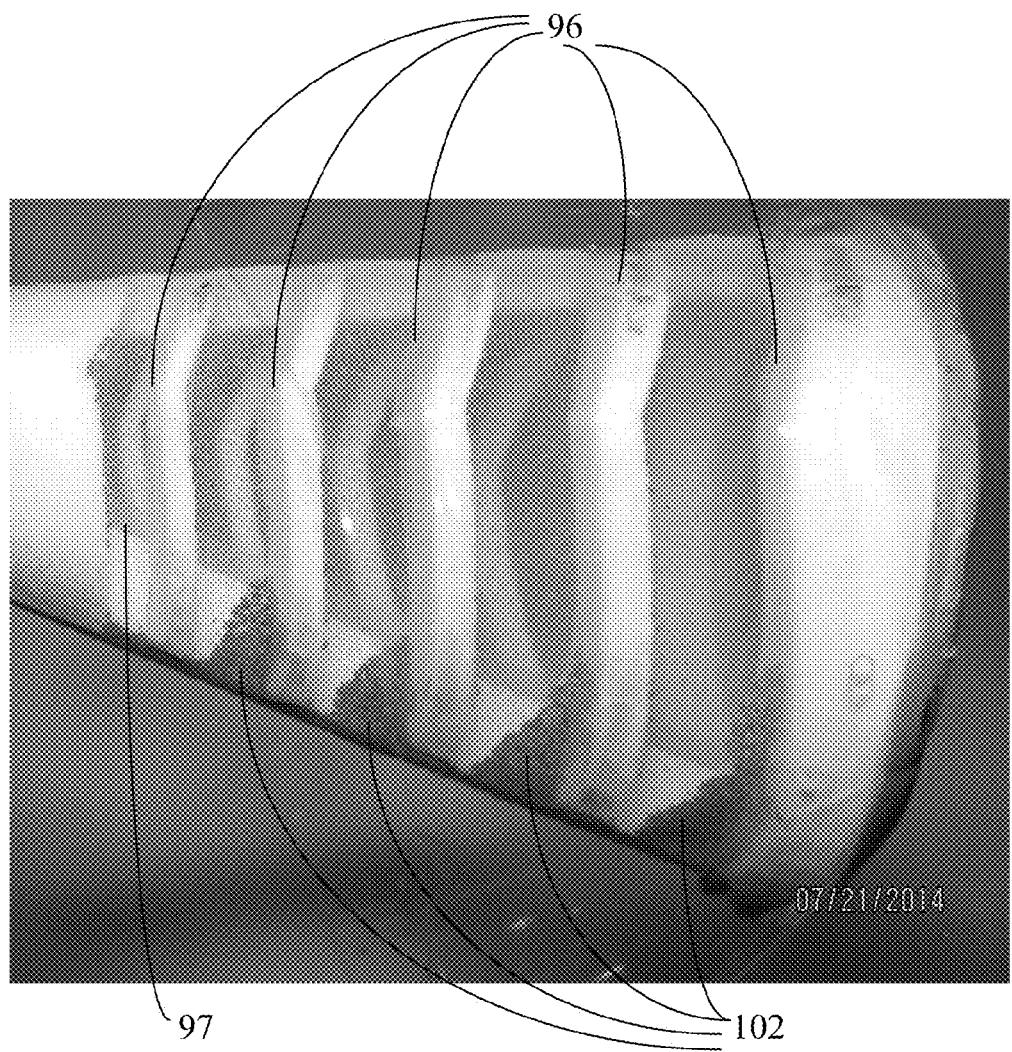
FIG. 19 is a photographic image of a prototype mass transfer device used for filtration illustrating particle accumulation adjacent to partial slot covers due to particle transport.

FIG. 19 is a photographic image of a different prototype filter that was constructed using slots that were graded in width, with slots having a width/height ratio ranging from 0.6 to 2.3. The widest slots were located at the front of the filter. As in Prototype Example 2, the filter was covered by a nylon mesh with a pore size of 140 microns and the same experimental set-up was used. However, the filter in Prototype Example 3 had a clear solid polymer film positioned along all of the slots' upstream exit areas where each piece of film 96 covered a small fraction of each slot similar to the schematic design illustrated in FIG. 9F. Additionally, a strip of film 97 was used to cover a fraction of the slots at the bottom interior region of the filter similar to the schematic design of FIG. 9G.

As in Prototype Example 2, a mixture of water and 200 micron particles was applied to the inflow of Prototype Example 3, and the resulting particle distribution was analyzed. As shown in FIG. 19 and documented in high-speed video (50-125 frames per second), the structural features of Prototype Example 3 manipulated the primary vortices to transport particles along the solid external border of the slots towards the bottom of the model. The particles were then deposited beneath film/cover 97 that covered interior portions of the slots, as the vortices exited from the slots at the bottom of the filter. Note that gravity did not cause these particles to settle passively to the bottom of the filter, as the flow speed inside the filter and the slots was approximately 30 cm/sec. Notably, Prototype Example 3 with film covering specific external and internal fractions of all slots was able to suspend, concentrate, and transport particles with an efficiency of approximately 99%. After concentration at the bottom of the filter, the particles can subsequently be removed from the filter using suction lines or drain lines (see FIG. 7 and FIG. 8).

The total of slot entry areas in Prototype Example 3 shown in FIG. 19 is 1.1 times the filter's open end area and the total of slot exit areas is 1.75 times the filter's open end area. It is noted that the initial configuration for this filter (i.e., total of slot entry areas was 1.0 times the filter's open end area and the total of slot exit areas was 1.65 times the filter's open end area) did not work well as the slots clogged with particles and no particles were transported. However, after the above-noted slight increase in entry and exit areas, vortices in the slots were generated that could both concentrate and transport particles to the bottom of the filter. Also, note that all of the above total exit areas refer to unobstructed exit area. In other words, if the slot exits are covered with a mesh or with a solid film, the solid area of the mesh or film must be calculated and subtracted from the exit area.

Prototype Examples 4 and 5

Figure 20:
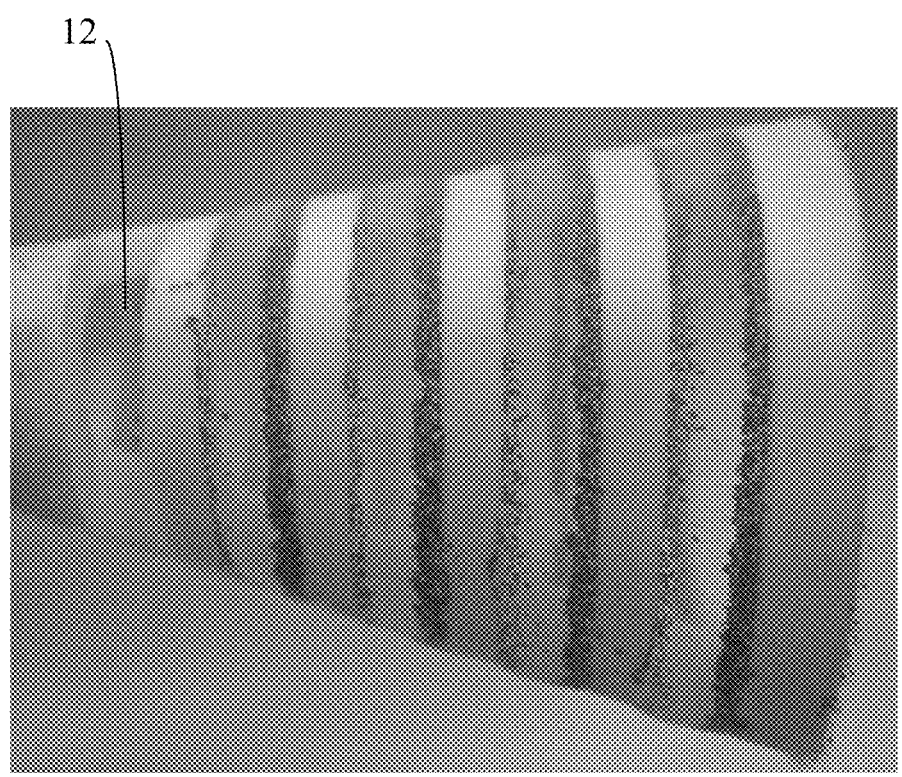
FIG. 20 is a photographic image of a prototype mass transfer device used for filtration illustrating particle concentration along the margins of membrane-covered slots despite one slot having no membrane covering same.
Figure 21:
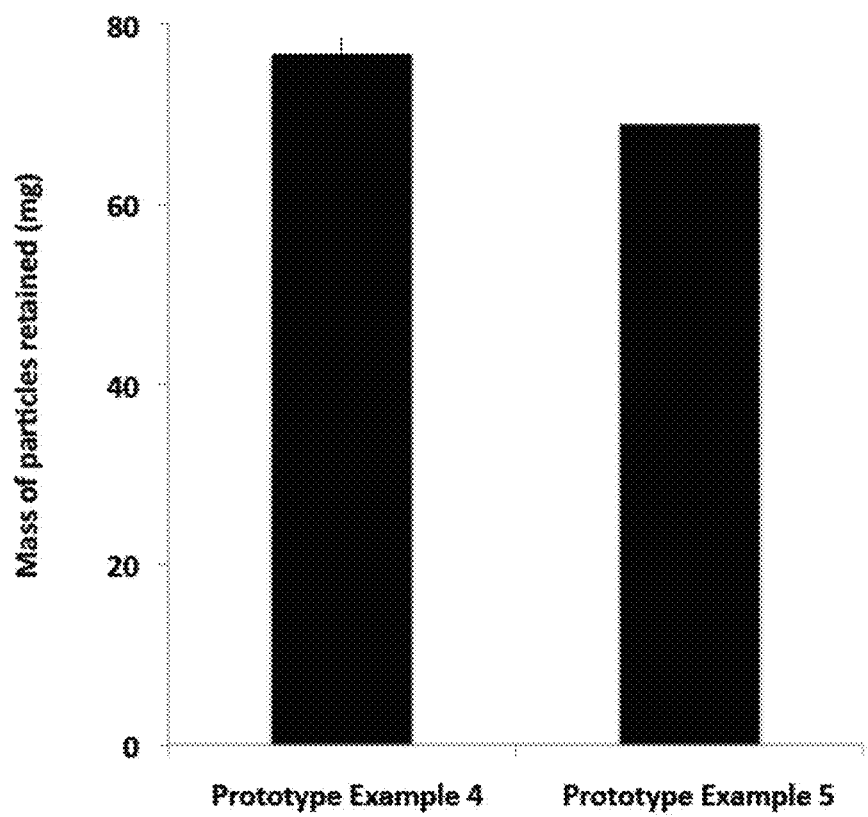
FIG. 21 is a graph of experimental results of the present invention illustrating substantial particle retention for the device configuration illustrated in FIG. 20 despite one slot having no membrane covering same.

The model in Prototype Example 4 had all of its slots covered by a nylon mesh membrane and the model in Prototype Example 5 had all slots except the last/downstream slot covered by a nylon mesh membrane. In each of these examples, no other features were added to the model/filter. The configuration for Prototype Example 5 is shown in FIG. 20 where the last/downstream slot with no mesh membrane is referenced by numeral 12. For the illustrated model, slot 12 with no membrane covering it created an unrestricted opening that was 7% of the total exit area of all slots in the model. That is, water was allowed to exit freely from this uncovered slot 12. Graphs of particle retention for Prototype Examples 4 and 5 are illustrated in FIG. 21, where the model in Prototype Example 5 with 7% of the mesh removed was still able to retain approximately 90% of the mass of 200 micron particles when exposed to three minutes of flow at 20 cm/sec as compared to Prototype Example 4 of the same configuration having a completely intact mesh membrane covering all of the device's slots.

INCORPORATION BY REFERENCE

All publications, patents, and patent applications cited herein are hereby expressly incorporated by reference in their entirety and for all purposes to the same extent as if each was so individually denoted.

EQUIVALENTS

While specific embodiments of the subject invention have been discussed, the above specification is illustrative and not restrictive. Many variations of the invention will become apparent to those skilled in the art upon review of this specification. For example, although the present invention has been described for a fluid flow that is moving through/over a stationary device of the present invention, the reverse could be true. That is, a device of the present invention could be moved in a stationary fluid to achieve the same advantages described herein. Accordingly, the full scope of the invention should be determined by reference to the specification along with such variations.

The articles "a" and "an" are used herein to refer to one or to more than one (i.e. to at least one) of the grammatical object of the article. By way of example, "a filter" means one filter or more than one filter.

Any ranges cited herein are inclusive.

I claim:

1. A mass transfer system comprising:
   a flow of fluid with particles entrained therein, said flow moving in a defined direction; and
   a wall structure disposed in said flow, said wall structure having a first surface and a second surface, said wall structure having a plurality of slots extending there through between said first surface and said second surface,
   each of said slots having a width, a length and a height,
   each of said slots having a slot entrance at said first surface, a slot exit at said second surface, an upstream margin, and a downstream margin, wherein said upstream margin and said downstream margin are defined relative to said defined direction of said flow,
   wherein, for each of said slots, a cross-sectional flow area defined at said slot entrance exceeds a cross-sectional flow area defined between said slot entrance and said slot exit;
   said length being at least approximately 3 times greater than said width for each of said slots,
   wherein a width-to-height ratio is defined for each of said slots and wherein, for each of said slots, said width-to-height ratio is less than approximately 5,
   said length of each of said slots oriented at an angle with respect to said defined direction of said flow, said angle ranging between 15° and 165°, and
   wherein vortices of said fluid with said particles entrained therein are generated in each of said slots.

2. A mass transfer system as in claim 1, wherein said wall structure comprises a tubular structure having at least one open axial end.

3. A mass transfer system as in claim 1, wherein said wall structure comprises a sheet of material.

4. A mass transfer system as in claim 1, further comprising a porous membrane covering at least a portion of said slots at said second surface.

5. A mass transfer system as in claim 1, further comprising protrusions coupled to said first surface adjacent to said slots.

6. A mass transfer system as in claim 1, further comprising protrusions coupled to marginal walls of said slots said upstream margin and said downstream margin.

7. A mass transfer system as in claim 1, further comprising channels defined in marginal walls of said slots said upstream margin and said downstream margin.

8. A mass transfer system as in claim 1, further comprising a cover spanning at least a portion of at least one of said slots.

9. A mass transfer system as in claim 1, further comprising conduits passing through said wall structure and terminating at open ends thereof at said upstream margin and said downstream margin of said slots.

10. A mass transfer system as in claim 1, further comprising grooves defined in said second surface and in fluid communication with said slots.

11. A mass transfer system as in claim 2, further comprising an annular skirt coupled to one said open axial end and extending along at least a portion of said tubular structure.

12. A mass transfer system as in claim 6, wherein said width-to-height ratio is less than one.

13. A mass transfer system as in claim 1, wherein said upstream margin and said downstream margin of said slots are movable.

14. A mass transfer system as in claim 1, wherein said slots define a herringbone pattern at said first surface and said second surface.

* * * * *